United States Patent
Eriksson

(10) Patent No.: US 6,705,839 B1
(45) Date of Patent: Mar. 16, 2004

(54) CONTROL SYSTEM AND METHOD FOR AIR COMPRESSOR

(75) Inventor: Stefan Eriksson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 09/763,683

(22) PCT Filed: Aug. 31, 1999

(86) PCT No.: PCT/SE99/01488

§ 371 (c)(1),
(2), (4) Date: Apr. 5, 2001

(87) PCT Pub. No.: WO00/19101

PCT Pub. Date: Apr. 6, 2000

(30) Foreign Application Priority Data

Sep. 14, 1998 (SE) ................................................ 9803117

(51) Int. Cl.$^7$ ................................................ F04B 19/24
(52) U.S. Cl. ................................ 417/53; 417/14; 417/9; 417/7
(58) Field of Search ............................ 417/53, 14, 19, 417/7

(56) References Cited

U.S. PATENT DOCUMENTS

| | | | | |
|---|---|---|---|---|
| 4,707,166 A | * | 11/1987 | Khosropour | 55/213 |
| 4,714,483 A | * | 12/1987 | Koening et al. | 55/163 |
| 5,103,576 A | * | 4/1992 | Cramer et al. | 34/46 |
| 5,145,495 A | * | 9/1992 | Elamin | 55/162 |
| 5,458,676 A | * | 10/1995 | Herbst et al. | 96/109 |
| 5,575,541 A | * | 11/1996 | Elamin | 303/1 |
| 5,592,754 A | * | 1/1997 | Krieder et al. | 34/527 |

* cited by examiner

Primary Examiner—Justine R. Yu
Assistant Examiner—William H. Rodriguez
(74) Attorney, Agent, or Firm—Burns, Doane, Swecker & Mathis, L.L.P.

(57) ABSTRACT

In a device and a method for controlling an oiled air compressor (1), which is included in a compressed-air system (2) for a motor vehicle and which is driven by the engine (3) of the motor vehicle and supplies compressed air to at least one consumer (12) in the compressed-air system (2), provision is made of, on the one hand, a control unit (14) for controlling the function of the air compressor (1) by activating the air compressor at a lower predetermined pressure level ($P_1$) for charging the compressed-air system and deactivating the same at a higher predetermined pressure level ($P_2$) for relieving the air compressor, and, on the other, a drainage unit (17), which in connection with the activation of the air compressor (1) drains pollutants, which have accumulated in the air compressor during the deactivation, before the air compressor is allowed to start charging the compressed-air system (2).

12 Claims, 1 Drawing Sheet

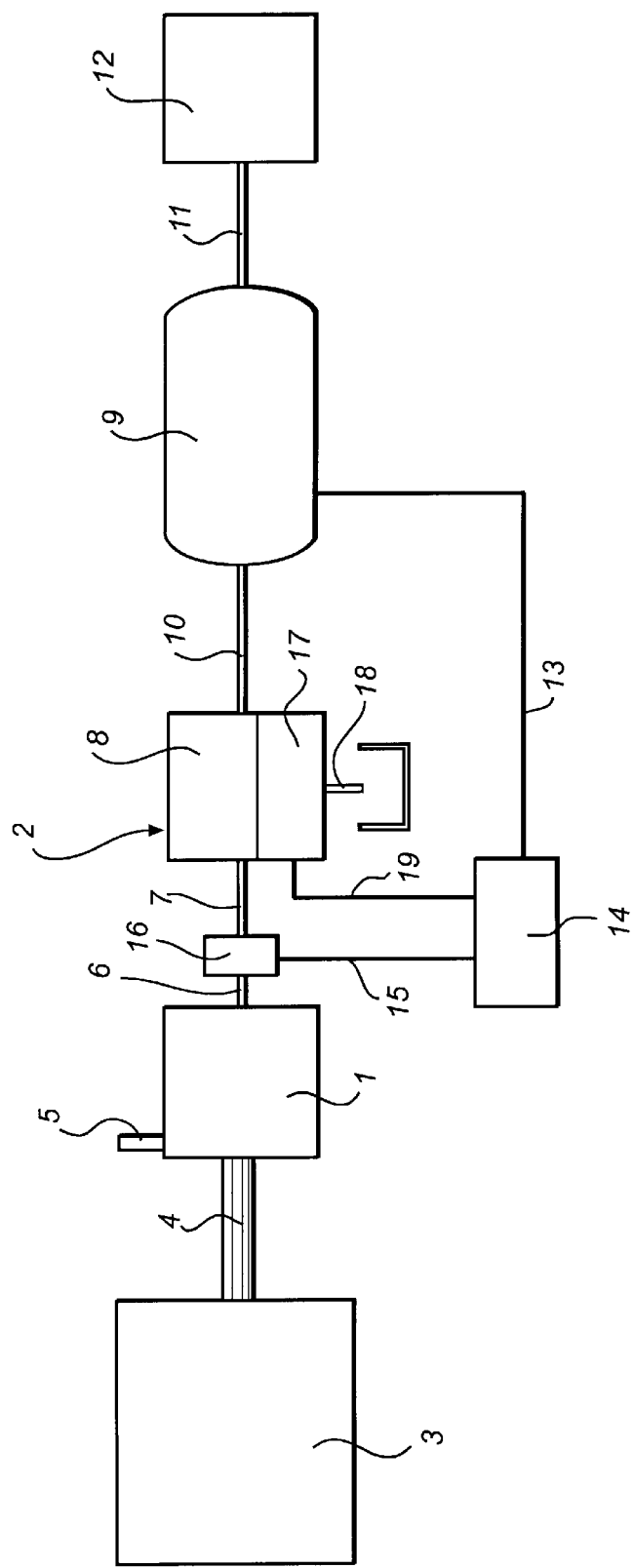

CONTROL SYSTEM AND METHOD FOR AIR COMPRESSOR

FIELD OF THE INVENTION

The present invention relates to a device for controlling an oiled air compressor, which is included in a compressed-air system for a motor vehicle and which is driven by the engine of the motor vehicle and supplies compressed air to at least one consumer in the compressed-air system, a control unit being provided for controlling the function of the air compressor by activating the air compressor at a lower predetermined pressure level for charging the compressed-air system and deactivating the same at a higher predetermined pressure level for relieving the air compressor. The invention also relates to a method for controlling an oiled air compressor, which is included in a compressed-air system for a motor vehicle and which is driven by the engine of the motor vehicle and supplies compressed air to at least one consumer in the compressed-air system, the function of said air compressor being controlled by being activated at a lower predetermined pressure level for charging the compressed-air system and deactivated at a higher predetermined pressure level for relieving the air compressor.

BACKGROUND OF THE INVENTION

In motor vehicles, in particular heavy goods vehicles, the internal combustion engine of the vehicle is normally used also to drive such auxiliary appliances as generators and air compressors. As to air compressors, they are lubricated with oil and in most cases of piston type. They are part of compressed-air systems for supplying various consumers, such as brakes and air suspension, in the vehicle with compressed air. The supply of lubricating oil to the air compressor is often connected with the internal combustion engine, such that the same lubricating oil is used for both.

For a long time, problems have arisen owing to lubricating oil from the air compressor being entrained into the system by the generated compressed air. The entrained lubricating oil is present in liquid as well as evaporated form and causes problems in the brakes, the air suspension etc, in the form of general messiness and swelling/degradation of primarily rubber packings.

Since the air compressor is driven by the internal combustion engine all the time and thus rotates constantly, whereas the generation of compressed air or charging is needed about 20–50% of the time, a system for controlling the charging is wanted. This may be achieved by means of a control unit, for instance a regulator, which activates the air compressor at a lower minimum pressure in the order of say 7.5 bar and deactivates the same at a higher maximum pressure in the order of say 12.5 bar.

The deactivation may be achieved by relieving the air compressor. Preferably, this is carried out by preventing the air compressor from charging air by blocking its outlet. The blocking may be provided by a shut-off device in the form of a stop valve or the like, which is controllable by the control unit. This means that the air compressor, which is still rotating, accumulates the lubricating oil which is needed for the lubrication of the compressor pistons and blows past the piston rings during the entire deactivation phase, that is until the renewed activation at the minimum pressure.

When the air compressor is activated and starts charging the compressed-air system by generating compressed air, the stored lubricating oil in liquid and evaporated form is entrained by the compressed air into the system. This is also the case of condensate and other pollutants which may have formed during the deactivation phase in the compressor cylinders by the relieving of pressure/cooling. If a dryer is also arranged in conventional manner downstream of the air compressor in the compressed-air system, a portion of the pollutants is captured by the air dryer. However, above all the evaporated portion of the lubricating oil passes the air dryer and is then precipitated/condensed in the brakes and the air suspension etc, causing the above-mentioned damage.

It is true that pollution of the above-described type also occurs when the air compressor is activated and generates compressed air. The total amount of pollutants is, however, completely decisive of how fast the problem arises.

In order to solve this problem to some extent, a so-called line onloader-system may be used. This means that the air compressor generates compressed air constantly and that excess air, when deactivating, is exhausted to atmosphere via a valve or the like, which can be provided in the air dryer. A great problem of this method is the high fuel consumption of the internal combustion engine. For instance, when driving 200,000 km, use is made of about 1000 l more fuel a year than in the case where the air compressor is deactivated.

OBJECT OF THE INVENTION

An object of the present invention is to make it possible to apply an inexpensive, space-saving and efficient solution to the problem of pollution in the compressed air after the deactivation phase in the air compressor.

SUMMARY OF THE INVENTION

This object is achieved by a device of the type defined by way of introduction by means of a drainage unit, which in connection with the activation of the air compressor drains pollutants, which have accumulated in the air compressor during the deactivation, before the air compressor is allowed to start charging the compressed-air system. In the method according to the invention, the object is achieved by draining, in connection with the activation of the air compressor, pollutants which have accumulated in the air compressor during the deactivation, before the air compressor starts charging the compressed-air system.

BRIEF DESCRIPTION OF THE DRAWING

Below, the invention will be described in detail with reference to the accompanying drawing. It illustrates a simple connection diagram of a preferred embodiment of the device according to the invention.

DESCRIPTION OF A PREFERRED EMBODIMENT

The device according to the invention, which is shown in the drawing, is in particular, but not exclusively, intended to be used in heavy motor vehicles, such as lorries and buses.

The device comprises an oiled air compressor 1, which is included in a compressed-air system generally designated 2 and intended for a motor vehicle (not shown). The air compressor 1 is of piston type and fixedly connected to an internal combustion engine 3, e.g. a diesel engine, to be driven constantly by the same. The connection may be provided by means of a suitable connection 4 in the form of, for instance, a drive shaft.

Moreover, the air compressor 1 has an inlet 5 for the supply of atmospheric air and an outlet 6 for the compressed air generated therein. More specifically, the compressed air is fed from the outlet 6 via a conduit 7 an air dryer 8 for drying the entering compressed air. Instead of the air dryer 8, some other suitable device may be provided for conditioning the compressed air. In some cases, the air dryer 8 may be omitted.

The dried compressed air is then fed on to an air tank or accumulator 9 of conventional design via a conduit 10. The accumulator 9 is in its turn connected in a suitable manner to one or more consumers. The drawing schematically shows how it is connected via a conduit 11 to a consumer 12, for instance the vehicle brakes, air suspension etc.

In the illustrated embodiment, the accumulator 9 is connected to a control unit 14 via a control conduit 13. The control conduit 13 can be a compressed air conduit or an electric signal line. The control unit 14 may be a pressure regulator and serves to control the function of the air compressor 1 depending on the system pressure in the compressed-air system 2. For this reason, the control unit 14 is connected to the air compressor 1 in a manner described below, via an additional control conduit 15, substantially corresponding to the control conduit 13.

The control unit 14 controls the function of the air compressor by activating the air compressor at a lower, predetermined pressure level $P_1$ for charging the compressed-air system 2 and deactivating the same at a higher, predetermined pressure level $P_2$ for relieving the pressure in the air compressor 1. As an example, it can be mentioned that the lower pressure level $P_1$ can be a minimum pressure in the order of 7.5 bar and the higher pressure level $P_2$ can be a maximum pressure in the order of 12.5 bar. These pressure levels are only examples and may be varied both upwards and downwards.

The deactivation of the air compressor is controlled by the control unit 14 and is provided, as mentioned above, by the relieving of the pressure in the air compressor. More specifically, this may be provided by blocking the air compressor 1, thus preventing it from charging the compressed-air system 2 with compressed air. The blocking may be achieved in many different ways. In the shown embodiment, the blocking is carried out by means of a shut-off device 16 which is placed at the outlet 6 of the air compressor 1. This device 16 may be in the form of a stop valve or the like. The above-mentioned control conduit 15 from the control unit 14 is then connected to the shut-off device 16 to open and close the same for activation and deactivation of the air compressor 1.

A drainage unit, generally designated 17, is also included in the compressed-air system. In connection with the activation of the air compressor 1 at the lower pressure level $P_1$, the drainage unit serves to drain pollutants, i.e. lubricating oil in liquid and evaporated form, condensate etc, which have accumulated in the air compressor 1 during the preceding deactivation phase, before the air compressor is allowed to start the charging proper of the compressed-air system 2 with compressed air.

The drainage unit 17 may be placed in the air compressor 1 itself on its outlet side or downstream of the air compressor 1 in the conduit 7. In the shown embodiment, the preferred position is shown, that is in connection with or integrated in the air dryer 8. The drainage unit 17 may have the form of a pressure-controlled discharge valve having a discharge 18, which for efficient drainage is suitably located at the lowest point in the compressed-air system 2.

Irrespective of the position of the drainage unit 17, it is here connected to the control unit 14 via yet another control conduit 19. When the control unit 14 sends a signal via the control conduit 15 to the shut-off device 16 of the air compressor 1 to open the same and thus activate the air compressor, it also sends a signal via the control conduit 19 to the drainage unit 17 to open the discharge 18 for draining the pollutants from the air compressor 1. When the air compressor 1, after the opening of the shut-off device 16, has rotated a suitable number of turns and discharged all its pollutants via the conduit 7 and the discharge 18 of the drainage unit 17, the drainage unit 17 is closed, so that the compressed air which is now generated by the air compressor can be fed on in the compressed-air system 2 to the consumer 12.

If the drainage unit 17 is placed inside the air compressor 1, it may be so arranged that it opens for drainage of the pollutants, before the air compressor is activated by the opening of the shut-off device 16.

The invention is not to be considered to be limited to the embodiment which is described above and shown in the drawing, and may be modified in many different ways within the scope of the appended claims.

What is claimed is:

1. A compressed air device, comprising:
    a compressed air system including an oiled air compressor, the compressed-air system supplying compressed air to at least one consumer in the compressed-air system;
    a control unit for controlling functioning of the air compressor, the control unit being adapted to activate the air compressor at a first predetermined pressure level for charging the compressed-air system and being adapted to deactivate the air compressor at a second predetermined pressure level; and
    a drainage unit that directly drains pollutants that accumulate in the air compressor during deactivation of the air compressor, the drainage unit being arranged in the compressed-air system so that the pollutants are drained before the air compressor starts charging the compressed-air system.

2. A device as claimed in claim 1, wherein the drainage unit is disposed downstream of the air compressor and has a discharge at a lowest point in the compressed-air system.

3. A device as claimed in claim 2, wherein a dryer for the compressed air is provided between the air compressor and the consumer, and the drainage unit is connected to the dryer.

4. A device as claimed in claim 1, wherein a dryer for the compressed air is provided between the air compressor and the consumer, and the drainage unit is connected to the dryer.

5. A device as claimed in claim 4, wherein the drainage unit is integrated in the dryer.

6. A device as claimed in claim 1, wherein the drainage unit includes a discharge that is adapted to open and close, the control unit being adapted to send a signal to the discharge to open the discharge when the control unit activates the air compressor.

7. A device as claimed in claim 1, wherein the drainage unit is disposed downstream of the air compressor.

8. A device as claimed in claim 1, wherein the drainage unit has a discharge at a lowest point in the compressed air system.

9. A method for operating a compressed air system including an oiled air compressor comprising:
    activating the air compressor at a first predetermined pressure level for charging the compressed-air system;
    deactivating the air compressor at a second predetermined pressure level; and
    before the air compressor starts charging the compressed air system, directly draining pollutants that accumulate in the air compressor during deactivation in a drainage unit.

10. A method as claimed in claim 9, wherein the drainage unit includes a discharge that is adapted to open and close, the discharge being opened when the air compressor is activated but before the air compressor charges the compressed-air system.

11. A method as claimed in claim 9, wherein the drainage unit is disposed downstream of the air compressor.

12. A method as claimed in claim 9, comprising discharging drained pollutants at a lowest point in the compressed air system.

* * * * *